UNITED STATES PATENT OFFICE.

DANDRIDGE H. BIBB, OF NEW YORK, N. Y., ASSIGNOR TO CONTINENTAL PROCESS CORPORATION, OF BRIARCLIFF VILLAGE, NEW YORK, A CORPORATION OF NEW YORK.

COHERING MASS AND PROCESS OF FORMING THE SAME.

1,158,363.  Specification of Letters Patent.  Patented Oct. 26, 1915.

No Drawing.  Application filed April 1, 1914.  Serial No. 828,892.

*To all whom it may concern:*

Be it known that I, DANDRIDGE H. BIBB, a citizen of the United States, residing at New York, county of New York, State of New York, have invented certain new and useful Improvements in Cohering Masses and Processes of Forming the Same, of which the following is a full, clear, and exact description.

My invention relates to a new and improved cohering mass and process of forming the same, and has for its object to produce cohering masses having granular material, such as iron ore, flue dust, pyrites cinders, hematite, titaniferous or other ores, etc., held together by pyroligneous tar. Such masses may be smelted to advantage in blast or other furnaces.

The following is a description of a process embodying my invention and the product produced thereby. In carrying out my invention, I make use of pyroligneous tar, the same being the waste tarry residue obtained from the destructive distillation of wood in the manufacture of wood alcohol. I also make use of granular magnetite, hematite, titaniferous ores, flue dust, or pyrites cinders, or other granular substances, according to the nature of the mass to be produced, or the use to which it is to be put. In producing a briquet by my process, I take an amount of flue dust or other granular material and sufficient pyroligneous tar to bind the same together. In practice, I have found that if I use an amount of pyroligneous tar equal to from six per cent. (6%) to eight per cent. (8%) by weight, of flue dust, I can obtain a satisfactory flue dust briquet. The proportion of the tar may be increased or diminished according to the strength required under particular circumstances, or where a greater amount of carbonaceous material is desired to assist in reduction of ore during smelting. In mixing the ingredients I heat the tar sufficiently to reduce it to the viscosity of heavy mineral oil and then mix it with the granular material, by means of any suitable mixing apparatus. I then press portions of the mixture one after another into briquets of the desired size by means of a briqueting apparatus, and preferably heat the briquets thus formed artificially to a temperature of from 500° to 600° F., maintaining them at this heat for a period of about ten to fifteen minutes. A higher heat may be used without serious disadvantage. After heating as above described, the process is completed and the briquets are fully formed, the same consisting of the granular material bound together throughout by a binder of pyroligneous tar. It is a well known fact that the fumes which come from pyroligneous tar when heated are very disagreeable. I have discovered that after subjecting a briquet in which the binder consists of pyroligneous tar to heat in the manner just above described, substantially none of these disagreeable fumes are given off. In forming other briquets, I proceed in a similar manner, varying the proportion of the binder from about four per cent., (4%) to about ten per cent. (10%) by weight, according to the character of the granular material and the character of the resultant briquet desired. If the briquets after shaping are exposed to a natural temperature in a dry atmosphere for a sufficiently long period of time, the artificial heating of them may be omitted. The masses thus formed are hard and durable and are substantially waterproof and keep their form at high temperatures and are substantially free from abrasion.

As will be evident to those skilled in the art, my invention permits of various modifications without departing from the spirit thereof or the scope of the appended claims.

What I claim is:

1. In the process of producing cohering masses, the improvement which comprises mixing divided material with a binder consisting of pyroligneous tar and subjecting the mixture to pressure so as to form cohering masses.

2. In the process of producing cohering masses, the improvement which comprises mixing divided material with a binder consisting of pyroligneous tar, subjecting the mixture to pressure so as to form cohering masses and heating the same when thus formed.

3. In the process of producing cohering masses, the improvement which comprises mixing divided material with a binder consisting of pyroligneous tar and subjecting the mixture to pressure so as to form cohering masses and subjecting the same when thus formed to artificial heat so as to substantially drive off the disagreeable fumes.

4. In the process of producing cohering masses, the improvement which comprises mixing flue dust with a binder consisting of pyroligneous tar and subjecting the mixture to pressure so as to form a cohering mass.

5. A new and improved cohering mass consisting of divided material bound together throughout by a binder consisting of pyroligneous tar from which the fumes have been substantially driven off.

DANDRIDGE H. BIBB.

Witnesses:
H. B. BROWNELL,
HENDERSON F. HILL.

Copies of this patent may be obtained for five cents each, by addressing the "Commissioner of Patents, Washington, D. C."